United States Patent [19]
Cash

[11] Patent Number: 5,804,434
[45] Date of Patent: Sep. 8, 1998

[54] PROCESS FOR REMOVING SOLVENT FROM SOIL AND DEBRIS

[76] Inventor: Alan Brian Cash, 7321 N. Hammond Ave., Oklahoma City, Okla. 73132

[21] Appl. No.: 734,729

[22] Filed: Oct. 21, 1996

Related U.S. Application Data

[63] Continuation of Ser. No. 323,859, Oct. 17, 1994, abandoned.

[51] Int. Cl.$^6$ ................................................. D06M 16/00
[52] U.S. Cl. .................... 435/262.5; 435/264; 405/128
[58] Field of Search ............................... 435/262.5, 264, 435/266; 210/603, 610, 772; 405/128

[56] References Cited

U.S. PATENT DOCUMENTS

| | | | |
|---|---|---|---|
| 5,205,415 | 4/1993 | Surtees | 209/21 |
| 5,384,048 | 1/1995 | Hazen | 210/605 |
| 5,398,757 | 3/1995 | Corte | 166/278 |

OTHER PUBLICATIONS

Goldfarb, A., Technical Aspects of Site Remediation: Soil Vapor Vacuum Extraction. Waste Management 14(2) 153–9, 1994.

*Primary Examiner*—Ralph Gitomer
*Attorney, Agent, or Firm*—Nydegger & Associates

[57] ABSTRACT

A process for removing solvent from soil and debris comprised of the steps of removing the solvent by soil vapor extraction and then washing the soil with a mixture of solvent eating bacteria, nutrients, and water is shown. The process decreases overall capital costs of solvent extraction systems, allows flexibility to size the equipment according to the needs at the individual clean-up site, allows for the purchase of "off the shelf" equipment, allows for easy transportation from site to site, operates more energy efficiently than current art, reduces material handling problems, and reduces the possibility of air emissions.

8 Claims, 2 Drawing Sheets

PROCESS FOR REMOVING SOLVENT FROM SOIL AND DEBRIS

This is a continuation patent application of application Ser. No. 08/323,859 filed on Oct. 17, 1994, abandoned.

FIELD OF THE INVENTION

This invention relates in general to the removal of hazardous, toxic, or radioactive components in soil and debris using solvent extraction processes and in particular to removing the solvent or wash media used by these processes. More specifically, this invention relates to a novel low cost method of removing the solvent or wash media with vapor extraction and biological methods.

BACKGROUND OF THE INVENTION

Heretofore, solvent extraction systems for removing hazardous, toxic, and/or radioactive materials from soil, sediment, sludges and debris have either used dryers in order to remove the solvent or washing agent, or have simply left the solvent or washing agent in the soil, sediment, sludges, and debris.

The solvents used in solvent extraction processes are typically volatile, so dryers can effectively remove the solvents from the soil.

Dryers, however, are high capital cost items. A typical dryer for a solvent extraction system rated at 10 tons per hour may cost in excess of $1,000,000 at the time of writing. This high capital cost prevents the flexibility to size dryers according to the needs at the individual clean-up site. Once a dryer is constructed, it needs to be used in that size range only. Greater utilization is not possible without an additional dryer, and lesser utilization will result in a poor return on capital investment.

The large capital costs of the dryer will also indicate that it is not a shelf stocked item. Thus, there may be long fabrication delays from suppliers.

Dryers are typically very large and bulky to transport. This is because the soil, sediment, sludge, and/or debris must fit inside the dryer. The large size adds to the cost of moving the dryer to the job site, and moving back to the storage area.

Dryers have high energy consumption, which leads to high operational costs. In order to remove the solvent from the soil, it must first be vaporized. Changing a liquid to a gas phase requires an energy consumption known as the latent heat. This latent heat is much higher than the specific heat needed to raise or lower the temperature of the gas or liquid. In order to separate the residual solvent or wash agent from the soil, all of the liquid phase must be turned into the gas phase.

Material handling is always a problem in dryers. Oversized material may jam mixer blades, while undersized materials, such as clays, tend to become airborne and need to be collected in large bag houses. Most soil, sediment, sludge and debris sites that are contaminated have a variety of solids sizes, a portion of which are not compatible with the dryer.

Some solvents and wash agents are flammable. In a dryer, two rocks hitting together can cause a spark which may cause the dryer to explode. This explosion risk can be lessoned by injecting an non-flammable gas such as nitrogen or carbon dioxide in the dryer, but this will raise operational costs, as the gas is typically lost when the dryer is emptied at the end of the drying cycle. Because of explosion risk, dryers are usually required to monitor the internal atmosphere for Lower Explosive Limit (LEL), percent Oxygen (O2), and Total Petroleum Hydrocarbons (TPH). This instrumentation adds to the capital cost of the dryer, while having someone monitor the instruments adds to the operational cost of the dryer.

Due to the inherent risk of explosion in dryers, and high maintenance costs associated with dryers, workers must be extensively trained to operate the system. This results in an increase in labor costs.

Dryers contain many moving parts which increases maintenance costs and thus operational costs. The moving parts are typically precision parts such as bearings, which are expensive and time consuming to replace.

Heating the soil, sediment, sludge or debris to drive-off the solvent or washing agent also increases the amount of solvent vapor, which may leak to the environment, as dryers typically run at higher than ambient pressure levels.

Not using a dryer and leaving the solvent or wash agent in the soil sediment, sludge and/or debris, is not generally a preferred condition. The solvent may be flammable, and leaving it in the soil, sediment, sludge, and/or debris may create a fire hazard from the volatilization of the solvent. Some of the solvents have a very bad odor, which may detract from the overall quality of the environment. Thus, there is a need to remove the solvent or wash agent from the soils, sediments, sludges, and/or debris that are processed by solvent extraction technologies.

Because of the high capital costs of owning a dryer, and the high energy consumption, material handling problems, explosion risk, labor training, maintenance, and potential for air emissions, there exists a need for a better method to remove the solvent or wash agent from the soil, sediment, sludge, and debris processed by solvent extraction technology.

SUMMARY AND OBJECTS OF THE INVENTION

In view of the foregoing limitations and shortcomings of prior art devices as well as other disadvantages not specifically mentioned above, it is apparent that a need exists in the art for a safe, low cost, and highly effective method of removing solvents and wash agents from soils, sediments, sludges, and/or debris processed with solvent extraction systems.

It is therefore an object of this invention to fulfill that need by providing a process for removing solvents and wash agents from soils, sediments, sludges, and/or debris that is safe to operate, has low capital costs, low energy consumption, exceptional material handling abilities, low maintenance costs, and has a low risk of damaging the environment.

Another object of this invention is a process that can be quickly adapted to the size of the site to be processed, instead of finding sites to fit the dryer's capacity.

A further object of this invention is a process that does not require all the liquid phase product to be turned into a gas phase product in order to achieve separation of solvent or wash media from the soil, sediment, sludge or debris.

A further object of this invention is a process that is easy to transport and set-up.

A further object of this invention is a process that greatly limits dust generation during solvent removal.

A further object of this invention is a process that requires little training to operate.

A further object of this invention is a process that is safer to operate than systems with dryers.

A further object of this invention is a process in which the equipment necessary can be delivered without long fabrication delays.

These objects and other objects not specifically mentioned above are accomplished in accordance with preferred embodiments of the present invention by the use of vapor extraction and biological methods to remove residual solvent and wash agent from soils, sediments, sludges, and/or debris that have been processed with solvent extraction technologies.

BRIEF DESCRIPTION OF THE DRAWINGS

A preferred embodiment of the invention is illustrated and described in the accompanying drawings wherein like numbers refer to like parts and in which.

REFERENCE NUMERALS IN DRAWINGS

1. Clean Soil With Residual Solvent in Solvent Extraction or Soil Washing Vessel
2. Bottom Collection Media
3. Knock Out Drum for Fluids
4. Vacuum Pump
5. Condenser for Solvent Vapors
6. Contaminated Solvent/Soil Washing Media Holding Vessel
7. Water Vessel with Water, Solvent Eating Bacteria, and Nutrients
8. Bacteria
9. Air pump for Oxygen Source and Mixing
10. Vapor Collection Tubes (Can double as Heated Gas Input Tubes)
11. Collection or Dispersion Manifold
12. Heater
13. Vessel Cover
14. Retaining Strap for Vessel Cover
15. Heated Gas Inlet (Can double as Solvent Vapor Outlet)

DESCRIPTION OF INVENTION

Figure 1:
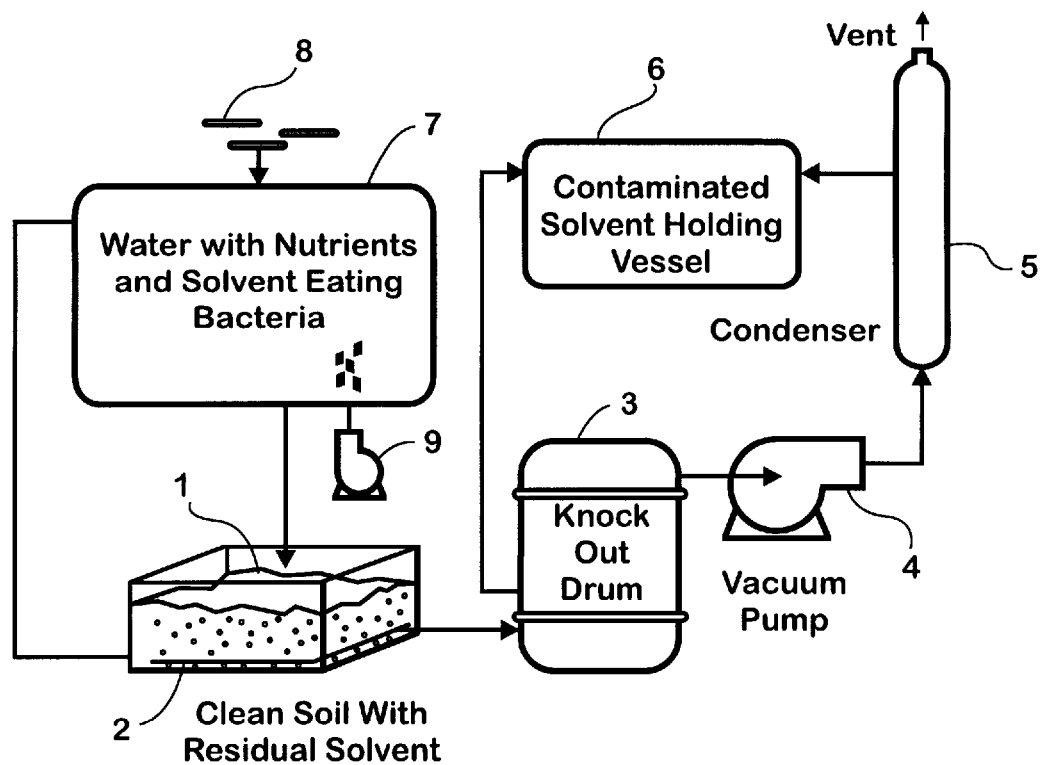
FIG. 1 is a schematic representation describing the interconnection between various portions of the process.

FIG. 1 is a schematic representation of a process for removing solvent and wash media from soil, sediment, sludge and debris. Clean Soil, sediment, sludge and debris cleaned of contaminants with solvent extraction or soil washing, but still containing residual solvent or wash media, is held within an extraction vessel (1). At the bottom of the extraction vessel (1) there is a bottom collection media (2), which can include but is not limited to rock, piping systems, metal or plastic grates, or other porous and permeable media. Attached to the bottom collection media is a knock out drum (3) for fluid collection. The fluids are drained or pumped to the contaminated solvent holding vessel, while the gas from the knock out drum (3) is pulled through a vacuum pump (4). The exhaust from the vacuum pump flows through a condenser (5) where the solvent or wash media collects. Liquids from the condenser are transferred to a contaminated solvent holding vessel (6). The gasses are vent to the atmosphere or a treated further (not shown).

After vapor extraction removes the bulk of the solvent or wash media, solvent eating bacteria (8) along with nutrients are added to a water holding vessel. This water is used as a flush media for the soil in the extraction vessel (1), and is then drained from the vessel and transferred back to the water tank (8). During biological treatment of the water/solvent/bacteria/nutrient mix, an air pump (9) adds oxygen to the water tank (8). The air pump (9) can also be used to mix the water and it's components.

Figure 2:
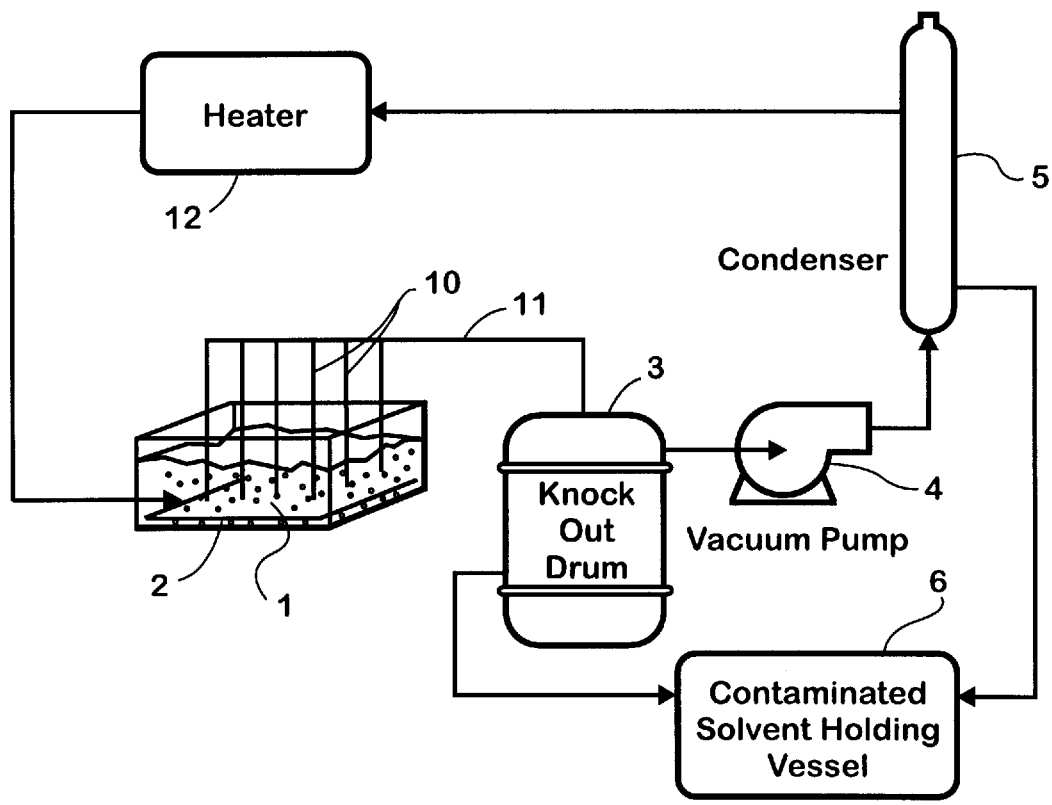
FIG. 2 is a schematic representation of a first alternative embodiment of the present invention.

FIG. 2 is a schematic representation of the second preferred embodiment of the present invention. The extraction tank, filled with soil that has been processed with solvent extraction or soil washing systems, has residual solvent or wash media within the soil. A set of Vapor Collection Tubes (10) are positioned in the soil to equally draw solvent vapors from the soil into a Collection or Dispersion Manifold (11) when placed on vacuum by the vacuum pump (4). A knock out drum (3) collects the liquids, which are transferred to the contaminated solvent holding vessel (6). Solvent or wash media vapors from the vacuum pump (4) are condensed in the condenser (5). The liquids from the condenser are collected in the contaminated solvent holding vessel (6), while the air travels to a Heater (12) and then back into the bottom collection media (2), completing a closed loop airflow.

Figure 3:
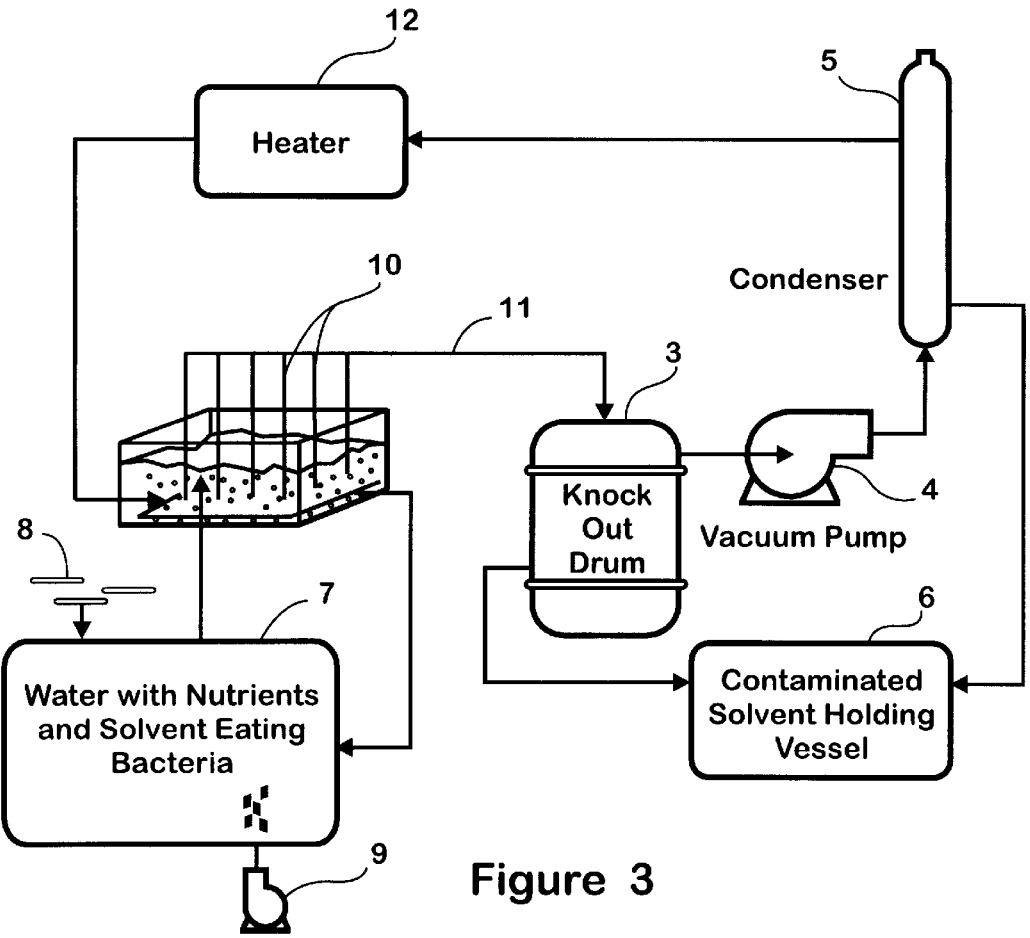
FIG. 3 is a schematic representation of a second alternative embodiment of the present invention.

FIG. 3 is a schematic representation of the third preferred embodiment of the present invention. FIG. 3 is similar to FIG. 2 described above, with the addition of a biological wash. A set of solvent eating bacteria (8) is added to a Water Vessel with Water, Solvent Eating Bacteria, and Nutrients (7). This blend is added to the soil (1) and is recovered from the bottom collection media (2) and is pumped back in the water vessel (7). An Air Pump for Oxygen Source and Mixing (9) also is attached to the water vessel (7).

Figure 4:
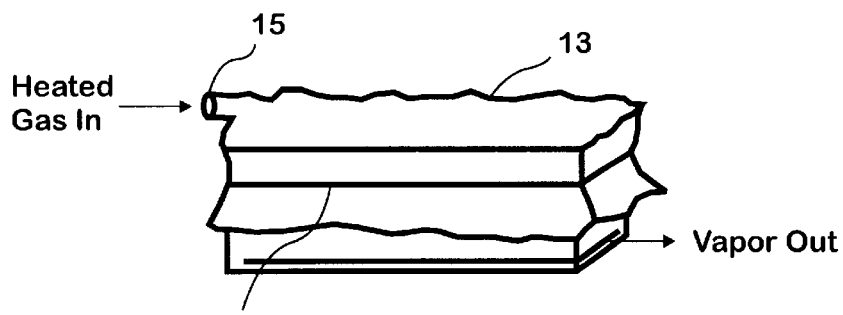
FIG. 4 is a schematic representation of a third alternative embodiment of the present invention.
Figure 5:
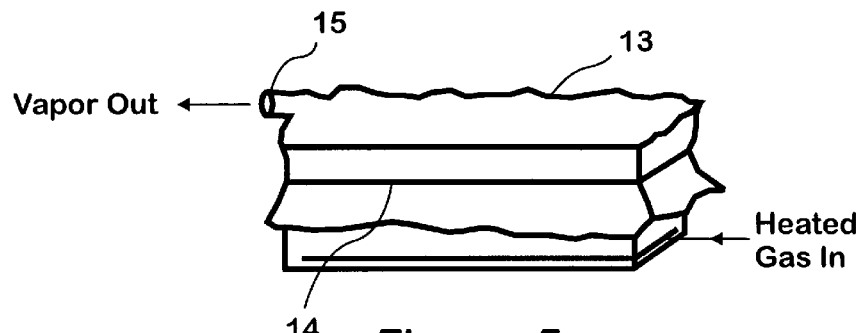
FIG. 5 is a schematic representation of an alternate embodiment for structure of the present invention shown in FIG. 4.

FIG. 4 is a schematic representation of the third preferred embodiment of the present invention. The clean soil with residual solvent in solvent extraction (1) is covered by a vessel cover (13) where heated air can be pumped into a Heated Gas Inlet (15) which can also double as Solvent Vapor Outlet. The heated gas outlet, which can also double as solvent vapor inlet is the drain for the bottom collection media (2). The vessel cover may be held in place with a Retaining Strap for Vessel Cover (14).

OPERATION OF THE INVENTION

FIG. 1 is a schematic representation of the current invention showing a two step process. First the soil in the extraction tank (1) is treated by vacuum extraction to remove the gross residual solvent from the soil. The soil is then flushed with a mixture of water, nutrients, and bacteria, which comprises a "bioflush". This "bioflush" is used in order to remove the final residual solvent left after vapor extraction of the soil.

In the first step, solvent is removed from the soil in the extraction vessel (1) by the use of vapor extraction. Any liquid solvent is first separated from the vapor stream by the knock out drum (3). By drawing a vacuum on the bottom of the extraction vessel (1), any free liquids are easily removed from the soil, without the need to vaporize all the liquid solvent. The liquid from the knock out drum (3) is transferred periodically to the contaminated solvent holding vessel (6). This recovered solvent can be processed by the system and reused to clean more soil. Vapors separated in the knock out drum (3) are pulled through the vacuum pump (4) and are then condensed in the condenser (5). The condensed liquids are transferred to the contaminated solvent holding vessel (6), and can be reused within the system to clean more soil. Air that has been stripped of the solvent load is vented to the atmosphere.

The solvent extraction process is run to reduce the residual solvent concentrations, not to remove all the solvent. At some point in time during the process, the solvent collection from the vapor extraction system will be minimal, and further processing will remove more solvent, but at great effort. At this point, the second step of the process is performed, a biological flush of the soil.

Water with nutrients and solvent eating bacteria (8) are introduced to the soil in the extraction vessel. The mixture of water, nutrients, and solvent eating bacteria can be called a "bioflush". The bioflush accumulates any residual solvent left from the vapor extraction phase and flushes it out of the tank back into the bioflush holding tank (7). This is a very energy efficient method for removing the low levels of solvent remaining in the soil after vapor extraction. Of course, the bioflush will not remove 100 percent of the residual solvent remaining after vapor extraction, but that small amount of solvent left in the soil will be eaten by the introduced bacteria.

The solvent washed into the separate bioflush holding tank (7) during the bioflush through the soil in the extraction tank (1) is biologically destroyed by the bacteria. The air pump (9), mixes the solvent equally, and allows the bacteria to come in contact easily with this food source. The air also serves as an oxygen source for the bacteria. Bioflushing the final residuals left after vapor extraction speeds the solvent removal process greatly, and also allows faster biological treatment of the final residual solvent than merely spraying the soil with an active culture. The external bioflush vessel (7) allows better conditions for bacterial growth, and easier management of nutrients and oxygen levels as they are consumed.

The water, bacteria and nutrients can be reused again and again, with the addition of minimal amounts of added nutrients. Biomass that accumulates in the vessel is removed during the flush through the soil. This adds live bacteria to the soil and organic matter, which improves the quality of the soil.

FIG. 2 shows a schematic representation of a first preferred embodiment of this invention. The same vacuum extraction system is used as in FIG. 1, with the additional elements of the heater (12). Instead of venting the air that is stripped of solvent in the condenser, the air is transferred to a heater, where it gains heat energy, and is then injected into the extraction vessel. The heated air stream can be injected in the heated gas inlet (15, FIG. 4) in the vessel cover (13), or into the bottom collection media (2) of the extraction vessel, or into the collection or dispersion manifold (11) which would subsequently travel into the vapor collection tubes (10). The heated air will assist in the vapor extraction, because the more heat, the greater the volitalization of the solvent from the soil. Additionally, when heated air is not injected, the volitalization of the solvent in the soil creates a temperature drop due to the latent heat, and this greatly reduces the amount of solvent in the vapor state, and thus greatly reduces the rate of solvent recovery. The temperature drop is not always noticeable in large scale vapor extraction systems due to the volume of soil, but when done ex-situ in tanks, the temperature drop is considerable, and the effects are devastating. As an example of this, on one 102 degrees F. day, the soil temperature in the interior of a 20 cubic yard roll-off bin undergoing solvent vapor extraction was 52 degrees F. This resulted in a very slow solvent removal rate.

An additional benefit of injection of the air stream is that the condensing system need not be 100% effective in removing the solvent. If only 90% effective, the residual solvent in the air stream would be injected into the soil tanks, not into the environment. Thus, the possibility of air pollution is lessened with this heated injection system, and the solvent vapor extraction proceeds at a faster rate.

FIG. 3 shows a schematic representation of a second preferred embodiment of the invention, essentially combining the solvent vapor extraction and "bioflush" process of FIG. 1 with the heated injection of air in a closed loop from FIG. 2. This system would work quickly to remove residual solvent from the soil, with the final residuals being eaten by bacteria.

SUMMARY, RAMIFICATIONS, AND SCOPE

Accordingly, the reader will see that the use of solvent vapor extraction, combined with either the bioflush or injection of heated air in a closed loop or both is a vast improvement over the current art. This process will decrease the overall capital costs of solvent extraction systems, allowing this remedial technology to be used more economically.

Further advantages include:

The low capital cost of vapor extraction and biological wash systems will allow flexibility to size the equipment according to the needs at the individual clean-up site. Higher capital cost equipment is limited to an operating range; greater utilization is not possible without additional expensive equipment, while lesser utilization will result in a poor return on capital investment.

The small capital costs for solvent vapor extraction and biological wash systems allows these items to be stocked by several vendors for "off the shelf" purchasing.

Solvent vapor extraction and biological wash systems are small and are easy to transport from site to site. This will reduce the overall costs of the treatment technology over current art, which uses bulky driers.

Solvent vapor extraction systems operate at better energy efficiencies than do dryers, as dryers tend to heat the entire soil, while a heated vapor extraction system would only heat pore spaces between soil grains, where the solvent is located.

Material handing with solvent vapor extraction and biological wash systems is much simpler than prior art. The soil does not have to be moved at all in order to operate the system. Oversized material will not be a problem, and clay fines are significantly (99% +) reduced.

Flammability of the solvent is less of a problem for solvent vapor extraction systems than driers, as rocks and metal debris can not spark. Flammability of the solvent is no problem in a bioflush.

Operation of the system is easy, and labor costs associated with vacuum extraction and biological treatment are historically low.

There are very few moving parts in a solvent vacuum extraction system and biological treatment system. Thus, maintenance of the system is low.

In both solvent vacuum extraction and biological treatment of the solvent, there is only limited heat applied, and there is little risk of the creation of unwanted organic compounds.

The use of injecting the air from the solvent vapor extraction system back into the soil reduces the risk of air emissions.

The use of injecting the air from the solvent vapor extraction system back into the soil will allow the use of less efficient condensing systems, as any escaping vapors will be reintroduced into the soil, and not into the environment. It is much less costly to build a system with a 99% solvent vapor removal efficiency than a system with a 100% solvent vapor removal efficiency. These savings can reduce treatment cost, with little effect on treatment timing.

The use of injecting the air from the solvent vapor extraction system back into the soil will speed the solvent removal of any vapor extraction system.

Although the description above contains many specificities, these should not be construed as limiting the scope of the invention but as merely providing illustrations of some of the presently preferred embodiments of this invention. For example, instead of recycling heated air, an inert gas could be recycled.

Thus the scope of the invention should be determined by the appended claims and their legal equivalents, rather than by the examples given.

I claim:

1. A method for removing a fluid solvent from a soil mixture comprising the steps of:

placing the soil mixture with fluid solvent into a substantially sealed extraction vessel;

placing a vacuum on at least a portion of the extraction vessel to extract at least a portion of the fluid solvent therefrom; and releasing a bioflush into the extraction vessel to degrade at least a portion of any of the fluid solvent remaining in the soil mixture.

2. The method of claim 1 comprising the step of recapturing a portion of the bioflush from the extraction vessel in a tank, after the step of releasing the bioflush into the extraction vessel.

3. The method of claim 1 wherein the step of placing a vacuum on at least a portion of the extraction vessel includes placing a vacuum on spaced apart tubes which are disposed in the soil mixture.

4. A method as recited in claim 1, further comprising the steps of:

separating the fluids extracted from the soil mixture into a liquid phase and a gas phase;

removing vapors of the solvent from the gas to create a gas;

heating the gas; and releasing the heated gas into the extraction vessel.

5. A method as recited in claim 4 wherein the removing step is accomplished by condensation of the vapors.

6. A method for removing a fluid solvent from a soil mixture, the method comprising the sequential steps of:

placing the soil mixture into a substantially sealed extraction vessel;

extracting fluids from the soil mixture in a substantially closed loop process by placing a vacuum on the extraction vessel, separating the fluids extracted from the soil mixture into liquid and gas, removing at least a portion of any vapors containing the solvent from the gas, heating the gas and releasing the gas into the extraction vessel; and flushing the soil mixture by releasing a bioflush into the extraction vessel to degrade at least a portion of the solvent remaining in the soil mixture.

7. The method of claim 6 comprising the step of recapturing a portion of the bioflush from the extraction vessel, after the step of flushing the soil mixture.

8. The method of claim 7 wherein the bioflush is released from a holding tank and recaptured in the holding tank and the step of flushing the soil mixture includes the step of supplying oxygen to the holding tank.

\* \* \* \* \*